Dec. 20, 1955     O. HAUGWITZ     2,727,396
VARIABLE SPEED DRIVE TRANSMISSIONS OF THE FRICTIONAL TYPE
Filed March 6, 1951     4 Sheets-Sheet 1
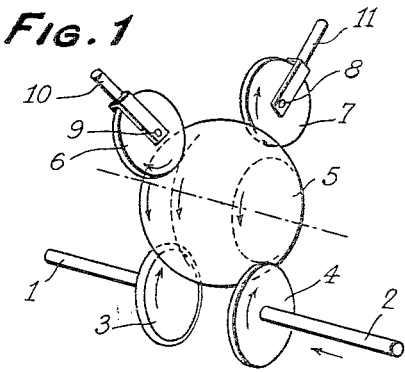
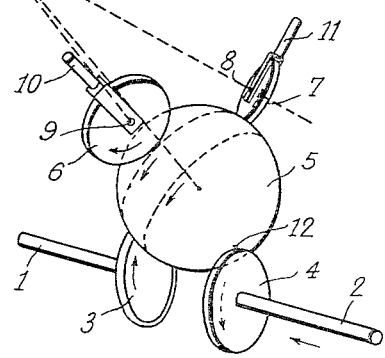
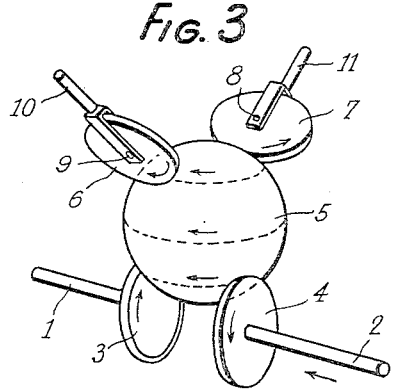
Inventor:
Otto Haugwitz
By Robert E. Burns
Attorney Dec. 20, 1955   O. HAUGWITZ   2,727,396
VARIABLE SPEED DRIVE TRANSMISSIONS OF THE FRICTIONAL TYPE
Filed March 6, 1951   4 Sheets-Sheet 2
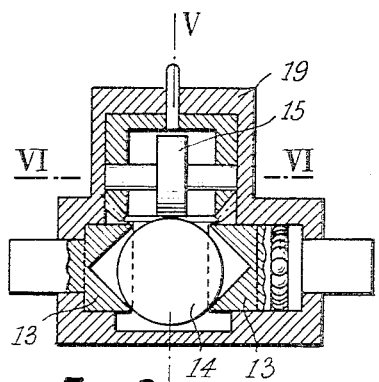
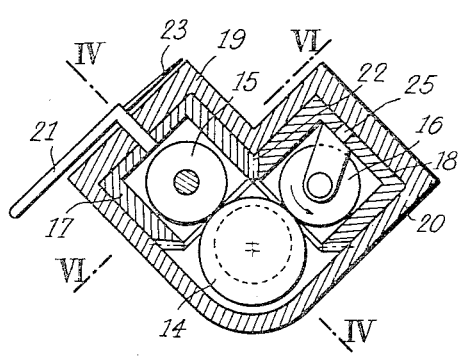
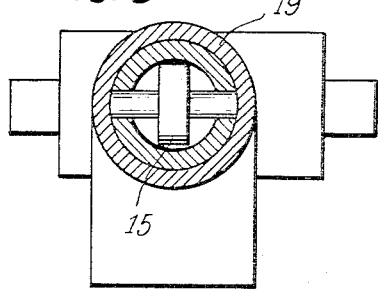
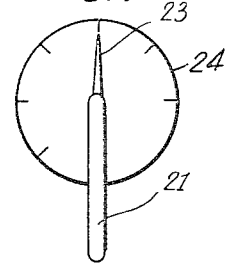
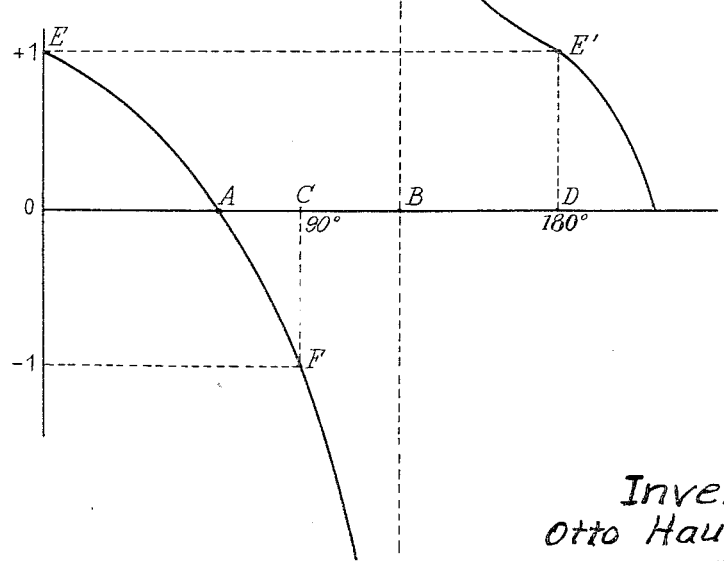
Inventor:
Otto Haugwitz
By Robert E. Burns
Attorney Dec. 20, 1955  O. HAUGWITZ  2,727,396
VARIABLE SPEED DRIVE TRANSMISSIONS OF THE FRICTIONAL TYPE
Filed March 6, 1951  4 Sheets-Sheet 3

Inventor:
Otto Haugwitz
By Robert E. Burns
Attorney

Dec. 20, 1955      O. HAUGWITZ      2,727,396
VARIABLE SPEED DRIVE TRANSMISSIONS OF THE FRICTIONAL TYPE
Filed March 6, 1951      4 Sheets-Sheet 4
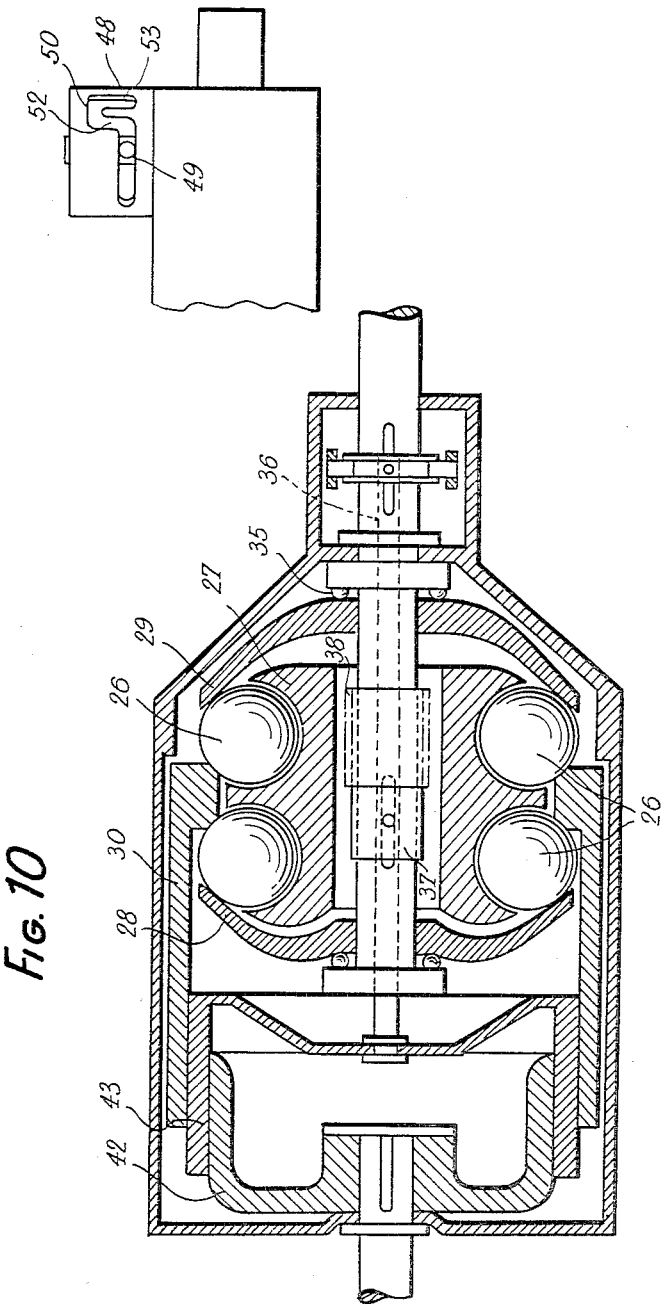
Inventor:
Otto Haugwitz
By Robert E. Burns
Attorney

United States Patent Office 2,727,396
Patented Dec. 20, 1955

2,727,396

VARIABLE SPEED DRIVE TRANSMISSIONS OF THE FRICTIONAL TYPE

Otto Haugwitz, Clichy, France, assignor to Societe Geoffroy-Delore, Paris, France, a corporation of France Application March 6, 1951, Serial No. 214,087

Claims priority, application France March 7, 1950

10 Claims. (Cl. 74—198)

This invention relates to variable speed transmissions or change speed gears of the frictional type, and more especially of the type including frictional balls and rollers.

Frictional speed variators using one or more balls in contact with rollers are already known. All such known devices however possess serious drawbacks; thus, in many such devices the drive ratio through the device is controlled by a lateral displacement of the elements in friction contact, so that the exertion of considerable stress is required; also, the frictional elements are frequently influenced by the forces to be transmitted; or again, intricate systems are necessary to maintain the balls in place and ensure a sufficient pressure between the elements at their respective points of contact engagement.

General objects of this invention are to provide a speed varying device of the type including frictional balls and rollers which overcomes these drawbacks, one that relies for its operation on a simple, efficient and novel kinematic principle; one in which the speed-varying control displacements require the exertion of extremely low stresses because they involve the castor-like pivotal rotation of rollers about their points of tangent contact with the balls, rather than sliding or rolling displacements; in which the operation is not appreciably influenced by the magnitude of the forces to be transmitted therethrough; which comprises an improved and simple arrangement for retaining all the components in frictional engagement under substantially uniform pressure throughout their respective points of contact; and one that is very readily adaptable for use as a reliable and efficient automatic speed-variator.

These and other objects and advantages of the invention will appear as the description proceeds.

In its essential principle, a speed-varying device according to the invention may be described as consisting of a ball which contacts a pair of spaced flanges secured face to face on a drive shaft and a driven shaft in mutual alignment, and said ball also contacting a pair of rollers normal to the surface of the ball and each freely rotatable about its centre axis and further pivotable castor-like about the line joining its centre with that of the ball, in which the plane defined by the pivotal axes of the rollers is normal to that defined by the radii of the ball which extend through the ball's points of contact with the flanges, and in which moreover the angle formed by the rollers' pivotal axes is approximately equal to the angle formed by the aforesaid radii, and the bisectrices of both said angles are aligned with each other.

An appropriate control, automatic or manual, enables the rollers to be pivoted simultaneously about their respective castor-like pivotal axes by equal angles in opposite directions, from an initial position in which the rollers lie in the common plane of their pivotal axes. In this initial position, the ball revolves about its centre axis which then extends parallel to the common axis of the drive and driven shafts, and the driven shaft is then caused to rotate in the same direction and at the same speed as the drive shaft. As the rollers are made to deviate from this initial position by equal amounts in opposite directions, to each such pivotal position of the rollers there corresponds a particular axis of rotation of the ball, and consequently a particular ratio of the velocities of rotation of the driven relatively to the drive shaft. This ratio will be termed the speed ratio of the device.

The range obtainable for this speed ratio theoretically extends from minus infinity to plus infinity, as will be later shown; obviously however, ratios too high in absolute value cannot practically be realized.

The invention is applicable with particular advantage to motor-cars and makes possible the construction of an automatic change-speed gear which maintains the speed of rotation of the engine constant as the resistant torque applied to the wheels is varied. In these and similar applications of the invention involving the transmission of considerable stresses, the provision of a single ball and a single pair of rollers as in the elementary arrangement just described as characterising the invention would of course be inadequate. Accordingly, the invention provides for arrangements combining a plurality of such elementary devices, and comprising a plurality of balls preferably arranged at the apices of at least one regular convex polygon symmetrical about the common axis of the shafts and cooperating with at least one set of rollers arranged intermediate, and tangent to, the adjacent balls in each polygon, each ball of the plurality moreover contacting on one side a flange rotatable with the drive shaft, and on the other side a flange rotatable with the driven shaft.

Two particular forms of embodiment of the invention will be described hereinafter by way of example, but it is to be understood that these examples are in no way restrictive, as both devices described may be subjected to numerous modifications without exceeding the scope of the present invention, and other arrangements may be devised in accordance with the invention's basic principle.

A schematic basic device will first be described and explained herafter before the two practical forms of construction are considered.

In the drawings:

Figs. 1, 2 and 3 are perspective views in different operating positions, of the schematic device which illustrates the basis of the present invention.

Figs. 4, 5 and 6 represent a first form of embodiment, Fig. 4 being a section on the line IV—IV of Fig. 5, Fig. 5 a section on the line V—V of Fig. 4, and Fig. 6 a section on the line VI—VI of Figs. 4 and 5.

Fig. 7 represents a detail of the first embodiment.

Figs. 8, 9 and 10 illustrate a second embodiment, Fig. 8 being a section on line VIII—VIII of Fig. 9, Fig. 9 being a section on line IX—IX of Fig. 8 and Fig. 10 being a section on line X—X of Fig. 9.

Fig. 11 represents a detail of the second embodiment.

Fig. 12 is a graph showing the variations of the speed ratio as a function of the pivoting angle of the rollers.

Figure 8:
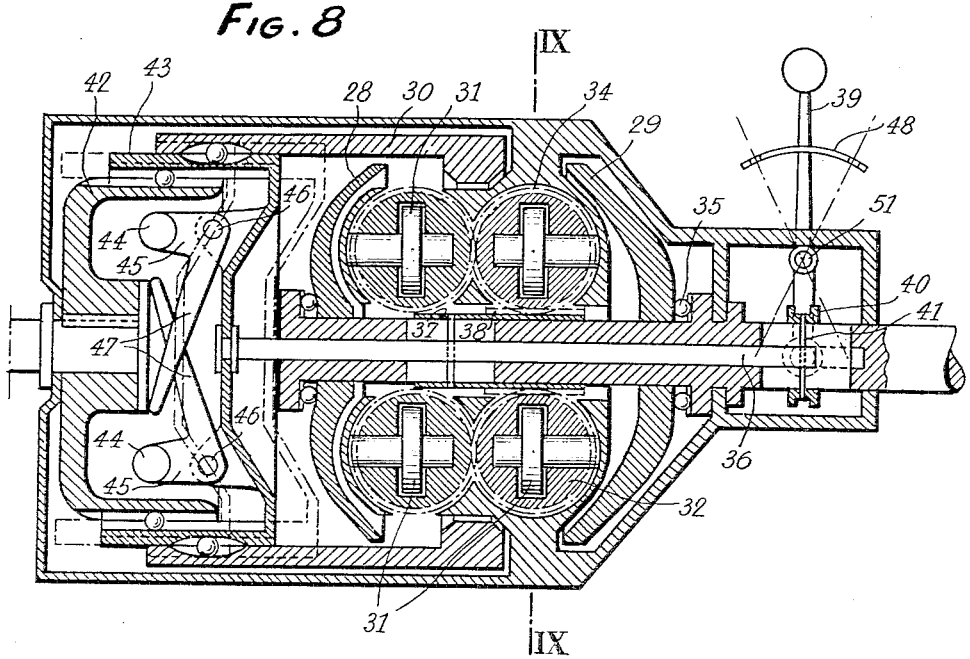

In the diagrammatic device illustrated in Figs. 1, 2 and 3, the drive shaft 1 and the driven shaft 2 are in alignment with each other and carry at their ends two discs or flanges 3 and 4 in face-to-face relationship. A ball 5 contacts the periphery of these discs. Two rollers 6 and 7 are applied against the ball 5. Both these rollers can revolve about the axes 8 and 9 extending through their centres and perpendicular to their plane; they can moreover each pivot in castor-like fashion respectively about the axes 10 and 11 which extend through the centre of the ball and through the points of contact of the rollers with the ball surface. The device possesses three essential geometric features which are:

1. The plane determined by the axis of the drive shaft and the driven shaft and by the centre of the ball, is perpendicular to the plane determined by the pivotal axes 10 and 11 of the rollers.

2. The angle formed by the radii of the ball terminating at the points of contact thereof with the discs 3 and 4 is approximately equal to the angle formed by the pivotal axes of the rollers.

3. Both aforesaid angles have a common bisectrix.

Any suitable device, not illustrated in Figs. 1 to 3, urges the driven shaft towards the drive shaft so as to create sufficient pressure at the different points of contact of the discs, the ball and the rollers, and this pressure is strictly equal at all the points of contact provided that the angles are strictly equal, owing to the inherent geometry of the device.

In the particular position shown in Fig. 1, the two rollers 6 and 7 lie in a common plane parallel to the discs 3 and 4; in such conditions, it is obvious that if the drive shaft is rotated, the ball will also start revolving about its diameter parallel to the drive and driven shafts, and the driven shaft itself will revolve at the same velocity and in the same direction as the drive shaft. The above-defined speed ratio in this case is therefore equal to unity.

If the two rollers 6 and 7 are caused to pivot about their pivotal axes 10 and 11 by equal angles and in opposite directions, a simple geometric discussion will show that the axes of rotation of the rollers that is the axes 8 and 9 will intersect at a certain point P. Under the effect of the drive shaft's rotation, the ball will then start to revolve about its diameter extending through the point P, so that the circumferential velocity of the ball at the points of contact of the rollers therewith, lies in the plane of each of the rollers.

Should the new axis of rotation of the ball be thus made to extend through the point of contact 12 of the ball's surface with the disc 4 on the driven shaft, the latter will remain stationary and the new speed ratio obtained is then equal to zero, this being illustrated in Fig. 2.

Fig. 3 shows the instance where the rollers have each turned 90° in opposite directions from their position of Fig. 1; it is seen that the ball's axis of rotation then coincides with a diameter perpendicular to the drive and driven shafts and that both these shafts revolve at a common velocity but in opposite directions. In this case the speed ratio is equal to −1.

Fig. 12 shows the curve giving the variations of the speed ratio plotted against the values of the pivoting angle of the rollers. It is seen that the point E corresponds to the case shown in Fig. 1, the point A to the case shown in Fig. 2, and the point F to the case shown in Fig. 3. When the ball's axis of rotation passes through the point of contact thereof with the disc on the drive shaft, there is a discontinuity in the curve, whereat the speed ratio jumps from −∞ to +∞. The corresponding point of the axis of abscissae is the point B. At the point E' corresponding to a pivotal angle equal to 180°, the speed ratio again assumes the value equal to unity which it had at the point E. The curve is obviously recurrent and the curve portion from point E to point E' recurs identically again and again as the pivotal angles of the rollers increases beyond 180°.

In the first form of embodiment illustrated in Figs. 4, 5, 6 and 7, the drive and driven shafts are provided at their adjacent ends with conically recessed flanges 13. A ball 14 is interposed between both flanges. Pressing on the ball are two rollers 15 and 16 arranged according to the principle explained above and illustrated in the previous figures. These rollers are mounted in cylindrical cages 17 and 18 mounted for rotation in casings 19 and 20. An actuating lever 21 makes it possible to rotate the cage 17 at will about its cylinder axis, and both cages 17 and 18 are formed with intermeshing bevel-gear teeth 22, so that any rotation imparted to the cage 17 by means of the lever 21 is transmitted to the cage 18 in the form of an equal but reverse rotation. The lever 21 carries a pointer 23 moving over a dial 24 upon which the speed ratio corresponding to any given position of the handle 21 may be directly read.

It is seen therefore that all of the geometrical characteristics of the diagrammatic device disclosed above, are mechanically realized in this first form of embodiment. The roller 16 may be mounted on an auxiliary pivot 25 concentric with or slightly offset from the axis of the corresponding cage, so that said roller will be caused to pivot automatically and accurately by the desired angles and the bevel gearing 22 may then be omitted.

As stated in the preamble, where a variator according to the invention is to be applied to the transmission of appreciable stresses, a single ball having a single pair of rollers associated with it would be insufficient, and arrangements are used according to the invention which combine a plurality of such elementary devices. Thus, there may be provided an even plurality of balls disposed at the apices of a regular polygon, e. g. a square, lying in a plane normal to the common axis of the shafts and symmetrical about such axis. An equal plurality of rollers are provided, each roller being located in between an adjacent pair of the balls and contacting the same at points situated on the line joining the centres of said adjacent balls. Each roller is mounted in a cage in which it is freely journalled about its centre axis normal to said line of centres and each roller-cage is moreover pivotable castor-like about the said line of centres. Means are provided preferably comprising a push-pull control rod coaxial with the device and rack teeth rigid with the rod meshing with gear-teeth of each roller-cage, for imparting to all the roller-cages simultaneously a common pivotal rotation such that, as seen from the center of each ball, one of the rollers contacting it is pivoted clockwise, and the other roller contacting it is pivoted anticlockwise. It can readily be seen that in this arrangement each elementary device consisting of a ball and the pair of rollers contacting it fulfils the geometric and kinematic conditions set forth previously.

Figure 9:
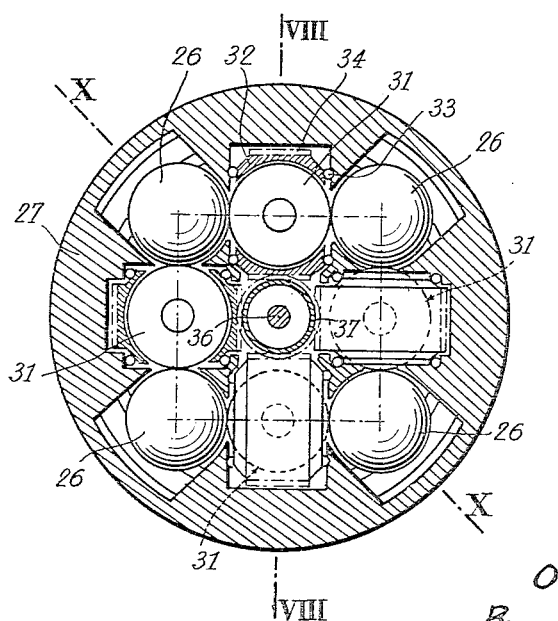

In a preferred form of embodiment, illustrated in Figs. 8, 9 and 11, there are eight balls positioned at the apices of two squares lying in parallel spaced planes perpendicular to the drive and driven shafts and spaced from each other in a direction parallel to the shafts. Four of these balls 26 are visible in Fig. 9; it can be appreciated that they are arranged at the four apices of a square the plane of which is perpendicular to the shafts. The other four balls are located rearwardly of the plane of this figure and respectively facing the balls 26. All these balls are mounted in a fixed block 27 for rotation about any selected axes extending through their respective centres.

A pair of recessed flanges 28 and 29 are mounted on the secondary or driven shaft and engage the outwardly-directed sides of the balls, while a further suitably conformed flange 30 driven from the primary or drive shaft is arranged, as shown, to engage the inwardly-directed sides of the balls; the balls are thus each clamped between the flange 30 on one side, and the flange 28 or 29, as the case may be, on the other.

Eight rollers are clamped between the balls; four of these may be seen, as designated by the numeral 31 in Fig. 9, the remaining four lying in a plane situated behind the plane of this figure, and respectively facing each of the first four rollers. Each roller is so arranged that it can not only turn about its axis, but also oscillate about an axis coincident with the centre line of the two adjacent balls. Each roller for this purpose is mounted in a cylindrical cage 32 which can pivot within a housing formed for it in the block 27, such pivoting motion being effected on ball-bearings 33. Each of the roller cages carries a set of teeth 34, and the roller cages of one square mesh through these teeth with the roller cages facing them in the other square.

Any suitable type of clamping device 35 urges the flange 29 which is slidable on the secondary shaft, and this thrust creates an equal pressure at all of the contact points of the balls and the rollers, and sufficient to prevent slippage. The desired pivotal movements are imparted to the rollers by means of a central control rod 36 slidable within the secondary shaft and actuating a ring 37 slidable over the outer surface of said shaft. This outer ring 37 is formed with gear teeth 38 which mesh with the gear-teeth of the four roller-cages disposed at the apices of a common square. It is seen therefore that a displacement of the central control rod 36 causes a displacement of the ring 37 with its teeth 38 which imparts a pivotal movement to the four roller-cages with which it is in mesh, the four said roller-cages then imparting in turn a corresponding pivotal movement to the remaining four roller-cages through the meshing gear-teeth peripherally formed thereon. The central control rod 36 is operated by means of an operating lever 39 acting in a groove of a sliding ring 40, which actuates the central control rod through the medium of a rod 41 movable in a slot formed in the secondary shaft.

In a common square, there may be two diametrically opposed roller-cages provided with some small amount of clearance along the line joining the centres of two adjacent balls, while the other two roller-cages of the same square are not provided with any substantial clearance.

It can be ascertained that in the kinematic arrangement thus provided each roller is constrained in all cases to pivot by an angle having the desired value and direction to participate in the transmission of motion from the primary shaft to the secondary shaft. This second form of embodiment of the invention is eminently suited to the construction of an automatic change-speed gear applicable for example to a motor-car. In order that an automatic change-speed gear be obtained, there must be available a first member responsive to the speed of rotation of the primary shaft, and a second member responsive to the drive torque of the primary shaft. The first member tends to increase the speed ratio, while the second member tends to reduce it. These opposite tendencies of the two members at all times balance each other, so that the primary shaft revolves at a constant speed regardless of the resisting torque applied to the secondary shaft. Thus, should the resisting torque increase, the primary motor torque will also increase, and therefore the speed ratio becomes less, but at such time, the speed of the primary shaft increases, and tends to increase the speed ratio; a state of balance finally sets in for a lower value of the speed ratio and the speed of rotation of the primary shaft is thus maintained constant.

This general principle of automatic change-speed gears is embodied in the device shown in Figs. 8, 9, 10 and 11 in the following way. The flange 30 is driven in rotation by the primary shaft and through the medium of the other two flanges, 42 and 43. The flange 42 is secured on the primary shaft and is coupled with the flange 43 by longitudinal splines or straight grooves in which balls are interposed. The flange 43 is coupled with the flange 30 by helical grooves containing balls. The flange 43 is integral with the central control rod 36, as shown in Fig. 8. A device resembling a centrifugal governor is mounted on the vertical part of the flange 43, and includes two inertia blocks 44 solid with bell-crank levers 45 pivoted at 46 to the flange 43 and the longer arms 47 of which engage the front end surface of the primary shaft.

It is seen that under the effect of the centrifugal force applied to the inertia blocks 44, these tend to move away from the primary shaft, causing the bell-crank levers 45 to swing about their axes 46, and the major branches 47 of these bell-crank levers engage and exert a high pressure on the end-surface of the primary shaft, thus urging rightwards in Fig. 8, that is rearwardly, the rod 36 which controls the pivotal movement of the rollers and consequently the change in speed.

Moreover, it is seen that under the effect of the torque applied to the flange 30, the flange 43 tends to move forwardly and to carry the control rod 36 with it in this direction, the helical grooves which couple the flanges 43 and 30 having a pitch of the appropriate direction to obtain such movement.

The control rod 36 is therefore subjected to two oppositely-directed actions, the one due to the torque and the other due to the centrifugal force and consequently to the speed of rotation of the primary shaft. The previously-explained condition required in the operation of an automatic speed-change device or variator is, accordingly fulfilled in the device shown in Fig. 8.

The control lever 39 moves in a selector grid 48 which is illustrated in plan view in Fig. 11. This selector grid includes a slot comprising a straight section 49 and a U-shaped section 50. The control lever 39 can not only turn about its axis 51 but also slide on said axis so as to occupy any position either in the section 49 or in the section 50 as desired. When the control lever is located in the arm 52 of the U-section, the speed ratio is equal to zero and consequently the secondary shaft is stationary. If the control lever is brought to the straight section 49 of the selector grid, it can freely swing backwards and forwards and the changes in speeds are effected automatically.

If the control lever is placed in the branch 53 of the U-section of the selector grid, a given negative speed ratio is then obtained, i. e. reverse drive is obtained. It may be noted that the reverse drive condition corresponds, on the diagram of Fig. 12, to some given point lying between the points A and F.

For long declivities in mountainous country, it is often convenient to be able to use the motor of the car as a brake. For this purpose, a device may be provided to secure the control lever 39 at any point of the slot 49 of the selector grid, so as to put temporarily out of action the automatic change-speed system and obtain the desired speed ratio.

Instead of using a device under the control of centrifugal force, such as that shown in Fig. 8, as the member responsive to the speed of the primary shaft, a member may be used which is subjected to the action of the pressure of the motor-lubricating oil, since such pressure is in practice substantially proportional to the R. P. M. of the motor.

The practical constructions described and illustrated herein are in no way restrictive, and many variations therein may be conceived without exceeding the scope of the invention.

What I claim is:

1. Speed-varying device which comprises a drive and a driven shaft in alignment, an even plurality of similar balls disposed at the apices of two axially-spaced polygons having their apices aligned parallel to the axial direction of the shafts, two flanges rotatable with one of the shafts, enclosing said plurality and each flange contacting all the balls of a related one of said polygons on their outward sides, and a flange rotatable with the other shaft and contacting all the balls of each polygon on their inward sides, and two sets of rollers interposed between and tangent to the adjacent balls of each polygon, a cylindrical cage mounting each roller for free rotation therein about the roller's centre axis and said cages pivotable castor-like about the line joining the roller's contact points with the adjacent balls, intermeshing gear teeth on the cage of each roller of one set and the cage of the corresponding roller in the other set, and operating means for imparting a common pivotal rotation to all the roller-cages of one set by a desired angle.

2. Speed-varying device as in claim 1 wherein said operating means comprises a slidable control rod extending axially of the device and rack-like gear means axially slidable with the rod and meshing with the said gear teeth of said one set of roller-cages.

3. Speed-varying device as in claim 2 wherein the two flanges contacting the outer sides of the plurality of balls are rotatable with the driven shaft while the one flange contacting the inner side of the balls is rotatable with the drive shaft, and the control rod extends coaxially through and is slidable relative to the driven shaft, and a ring is slidable with the rod and surrounds the driven shaft and has said rack-like gear means formed therearound meshing with the said gear teeth of said one set of roller-cages.

4. Speed-varying device as in claim 1 wherein each of said polygons is a square.

5. Speed-varying device as in claim 4 wherein one diametrically opposed pair of rollers in at least one of said squares is mounted with a substantial amount of clearance in the direction of the line of centres of its adjacent balls, while the other opposed pair of rollers in said square is mounted without substantial clearance in such direction.

6. In an automatic speed-varying device from a drive shaft to an aligned driven shaft, an even plurality of similar balls disposed at the apices of two identical regular polygons symmetrical about the common shaft axis and lying in respective planes normal to and axially spaced along said common axis, said polygons having their corresponding apices aligned parallel to said axis, two flanges rotatable with the driven shaft, enclosing said plurality and each contacting all the balls of a related one of said polygons on their outward sides, a further flange contacting all the balls of each polygon on their inward sides, two sets of rollers interposed between and tangent to the adjacent balls of each polygon, a cylindrical cage mounting each roller for free rotation therein about the roller's centre axis and said cages pivotable castor-like about the line joining the roller's contact points with the adjacent balls, intermeshing gear teeth on the cage of each roller of one set and the cage of the corresponding roller in the other set, a push-pull control means extending coaxially with and slidable relative to said driven shaft, rack means axially slidable with said push-pull control means and meshing with said gear teeth on each roller-cage of one set, first means responsive to the speed of rotation of said drive shaft and urging said push-pull means in the direction tending to increase the drive ratio through the device as said speed increases, and second means responsive to the torque acting on the drive shaft, and urging said push-pull means in the direction tending to decrease said drive ratio as said torque increases, said second responsive means connecting said further flange for rotation with the drive shaft.

7. Automatic speed-varying device as in claim 6 wherein said first responsive means comprises a centrifugal governor arrangement.

8. Automatic speed-varying device as in claim 6 wherein said first responsive means comprises a radial flange rigid with said push-pull control means, a bell-crank lever pivoted on said radial flange, an inertia mass on a radially outer arm of said bell-crank lever, and a fixed surface axially abutting the radially inner arm of said lever to urge the push-pull means away from said surface as said inertia mass tends to spread radially out under centrifugal force.

9. Automatic speed-varying device as in claim 6 wherein said second responsive means comprises a first bushing rigid with the push-pull means and slidable but not rotatable relative to the drive shaft, a second bushing rigid with the said further flange and interengaging helical means on cooperating surfaces of both said bushings of such pitch direction that an increase in the torque applied to the said further flange tends to move the first bushing relative to the second bushing in a direction to cause the rollers to pivot in the direction which reduces the drive ratio through the device.

10. Automatic speed-varying as in claim 6 which comprises a manual operating lever acting on said push-pull means, and a selector grid associated with said operating lever and including a straight section parallel to the push-pull means, whereby the lever when located in the straight section will follow the automatic displacements assumed by said push-pull means under the combined action of said first and second responsive means to impart a range of positive transmission ratios through the device, and two transverse sections in said selector grid such that the latter when located in one thereof imparts a position to the push-pull means corresponding to a zero transmission ratio, while in the other transverse section it imparts a position to the push-pull means corresponding to a predetermined negative transmission ratio.

References Cited in the file of this patent

UNITED STATES PATENTS

| | | |
|---|---|---|
| 1,718,846 | Arter | June 25, 1929 |
| 1,850,189 | Weiss | Mar. 22, 1932 |
| 1,926,279 | Gray | Sept. 12, 1933 |
| 1,979,170 | Nardone | Oct. 30, 1934 |
| 2,126,772 | Haskell | Aug. 16, 1938 |
| 2,535,028 | Arter | Dec. 26, 1950 |